United States Patent
Liang et al.

(10) Patent No.: US 10,505,958 B2
(45) Date of Patent: Dec. 10, 2019

(54) METHOD FOR DETECTING ABNORMAL TRAFFIC

(71) Applicant: Guangdong Eflycloud Computing Co., LTD, Foshan (CN)

(72) Inventors: Runqiang Liang, Foshan (CN); Wei Shi, Foshan (CN); Jian Mai, Foshan (CN); Yanbo Huang, Foshan (CN); Yu Min, Foshan (CN); Jianren Yi, Foshan (CN)

(73) Assignee: GUANGDONG EFLYCLOUD COMPUTING CO., LTD, Foshan (CN)

( * ) Notice: Subject to any disclaimer, the term of this patent is extended or adjusted under 35 U.S.C. 154(b) by 173 days.

(21) Appl. No.: 15/267,253

(22) Filed: Sep. 16, 2016

(65) Prior Publication Data
US 2017/0078316 A1    Mar. 16, 2017

(30) Foreign Application Priority Data
Sep. 16, 2015 (CN) .......................... 2015 1 0591310

(51) Int. Cl.
*H04L 29/06* (2006.01)

(52) U.S. Cl.
CPC ...... *H04L 63/1425* (2013.01); *H04L 63/1416* (2013.01)

(58) Field of Classification Search
CPC ................. H04L 63/1425; H04L 63/1416
See application file for complete search history.

(56) References Cited

U.S. PATENT DOCUMENTS

| | | | | |
|---|---|---|---|---|
| 6,609,205 | B1* | 8/2003 | Bernhard et al. | G06F 11/00 713/201 |
| 7,478,156 | B1* | 1/2009 | Pereira | G06F 15/173 709/224 |

(Continued)

FOREIGN PATENT DOCUMENTS

| | | |
|---|---|---|
| CN | 101150581 A | 3/2008 |
| CN | 101383694 | 3/2009 |

(Continued)

OTHER PUBLICATIONS

Japanese Office Action based on application No. 2016-179548 (2 pages and 2 pages of English translation) dated Nov. 29, 2016 (Reference Purpose Only).

(Continued)

*Primary Examiner* — Chau Le
*Assistant Examiner* — Vance M Little
(74) *Attorney, Agent, or Firm* — Viering, Jentschura & Partner

(57) ABSTRACT

A method for detecting abnormal traffic may include receiving messages, counting the messages by types thereof, storing resulting counts to an IP hash array, and storing traffic characteristics in the IP hash array, depending on information on the counts of the messages stored in the IP hash array, storing IP information of the messages in the first N ranks in terms of count to a sequencing array wherein N is a natural number, receiving new IP information, and updating the IP information of the messages in the first N ranks and storing the updated IP information to the sequencing array, and in the updated sequencing array, verifying occurrence of abnormal traffic associated with the messages of a specific said type against a preset corresponding characteristic value.

6 Claims, 4 Drawing Sheets

(56) References Cited

U.S. PATENT DOCUMENTS

| | | | |
|---|---|---|---|
| 8,706,866 B2* | 4/2014 | Noh et al. | G06F 21/20 709/224 |
| 9,020,954 B2* | 4/2015 | Sun et al. | G06F 17/30 707/723 |
| 9,313,224 B1* | 4/2016 | Roskind | H04L 63/1458 709/223 |
| 9,838,354 B1* | 12/2017 | Tulasi | H04L 63/02 |
| 2002/0035628 A1* | 3/2002 | Gil | H04L 43/00 709/224 |
| 2002/0133586 A1* | 9/2002 | Shanklin et al. | G06F 15/16 709/224 |
| 2003/0198183 A1* | 10/2003 | Henriques | H04M 15/58 370/229 |
| 2003/0226035 A1* | 12/2003 | Robert | H04L 63/1408 726/22 |
| 2004/0215976 A1* | 10/2004 | Jain | H04L 9/00 713/201 |
| 2006/0075489 A1 | 4/2006 | Ganguly et al. | |
| 2007/0255861 A1* | 11/2007 | Kain et al. | G06F 3/00 710/8 |
| 2009/0113246 A1* | 4/2009 | Sabato | G06F 11/0769 714/37 |
| 2010/0220619 A1 | 9/2010 | Chikira et al. | |
| 2010/0260204 A1* | 10/2010 | Pepper et al. | H04L 29/04 370/474 |
| 2011/0170413 A1 | 7/2011 | Shi et al. | |
| 2012/0030348 A1 | 2/2012 | Shi et al. | |
| 2012/0151583 A1 | 6/2012 | Kang et al. | |
| 2014/0047543 A1 | 2/2014 | Kim et al. | |

FOREIGN PATENT DOCUMENTS

| | | |
|---|---|---|
| CN | 103748853 A | 4/2014 |
| CN | 104202336 | 12/2014 |
| JP | 2006237892 A | 9/2006 |
| JP | 2008507222 A | 3/2008 |
| JP | 2009089241 A | 4/2009 |
| WO | 2006008307 A1 | 1/2006 |
| WO | 2013015691 A1 | 1/2013 |

OTHER PUBLICATIONS

Chinese Office Action based on application No. 201510591310.X(5 Pages), dated Apr. 29, 2016 (Reference Purpose Only).

* cited by examiner

METHOD FOR DETECTING ABNORMAL TRAFFIC

CROSS-REFERENCE TO RELATED APPLICATION

This application claims priority to Chinese Patent Application Serial No. 201510591310.X, which was filed Sep. 16, 2015, and is incorporated herein by reference in its entirety.

TECHNICAL FIELD

Various embodiments relate generally to computer systems and, more particularly, to a method for detecting abnormal traffic.

BACKGROUND

Botnets provide an easy, influencing and hard-to-track way of attacks, and become a positive contributor to the rapid growth and extensive spread of distributed denial of service attacks, or DDoS attacks. A botnet is constructed from tens of thousands of hosts, and supplies the bandwidth and hosts required by large-scale DDoS attacks that relate to huge network traffic, thereby causing serious damage to the attacked networks. As DDoS attacks evolve and develop more sophisticated, the challenges in terms of security and operation posed to Internet service providers (ISPs), Internet content providers (ICPs) and Internet data centers (IDCs) are increasing. These dealers have to detect traffic and perform scrubbing before DDoS attacks endanger their core business and applications, so as to ensure normal network operation and business development.

DDoS attacks can cause vast damage, including preventing the attacked server from normal function, jamming and even paralyzing the entire network, and affecting other servers in the same network. Thus, it is particularly important to find out attacks in networks timely.

The existing methods for detecting attacks are usually based on either using a fixed threshold or creating a traffic dynamic baseline. However, both of these approaches are obviously defective. Fixed thresholds can lead to false positive or negative reports when not set accurately. Traffic dynamic baselines are likely to trigger false positive reports when working with small targets that have small bases and likely to give false negative reports when used in cases where traffic is large and changes are not significant. Moreover, tending to trigger false positive reports in response to normal traffic surges is a common defect of the both. In addition, setting dynamic baselines is not an effective way to detect attacks in the initial stage of a newly created target. There is even the case that when a baseline is created based on attacked traffic, it is impossible to detect any attacks taking place in this target.

SUMMARY

In view of this, various embodiments provide a method for detecting abnormal traffic so as to solve the technical problems seen in the existing technology.

According to one embodiment of the present disclosure, a method for detecting abnormal traffic includes the following steps:

receiving messages;

counting the messages by types thereof, storing resulting counts to an IP hash array, and storing traffic characteristics in the IP hash array;

depending on information on the counts of the messages stored in the IP hash array, storing IP information of the messages in the first N ranks to a sequencing array wherein N is a natural number;

receiving new IP information, updating the IP information of the messages in the first N ranks and storing the updated IP information to the sequencing array; and in the updated sequencing array, verifying occurrence of abnormal traffic associated with the messages of a specific said type against a preset corresponding characteristic value.

The disclosed method for detecting abnormal traffic adopts the improved minimum binary heap algorithm to rank targets across the network by traffic and other indexes in a real-time manner and then identify those targets ranking first, thereby determining whether these targets show behavior related to abnormal traffic. This method is suitable to all networks, and is capable of detecting even attacks taking place when a program is just triggered and recognizing normal traffic surges. The disclosed method for detecting abnormal traffic effectively resolves problems related to false positive and negative reports caused by fixed thresholds and traffic dynamic baselines of the related art methods, and thereby detects attacks accurately and timely, thereby reducing its false positive rate and false negative rates.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DESCRIPTION

For further illustrating the means and functions by which the present disclosure achieves the certain objectives, the following description, in conjunction with the accompanying drawings and preferred embodiments, is set forth as below to illustrate the implement, structure, features and effects of the subject matter of the present disclosure.

Embodiment I

Figure 1:
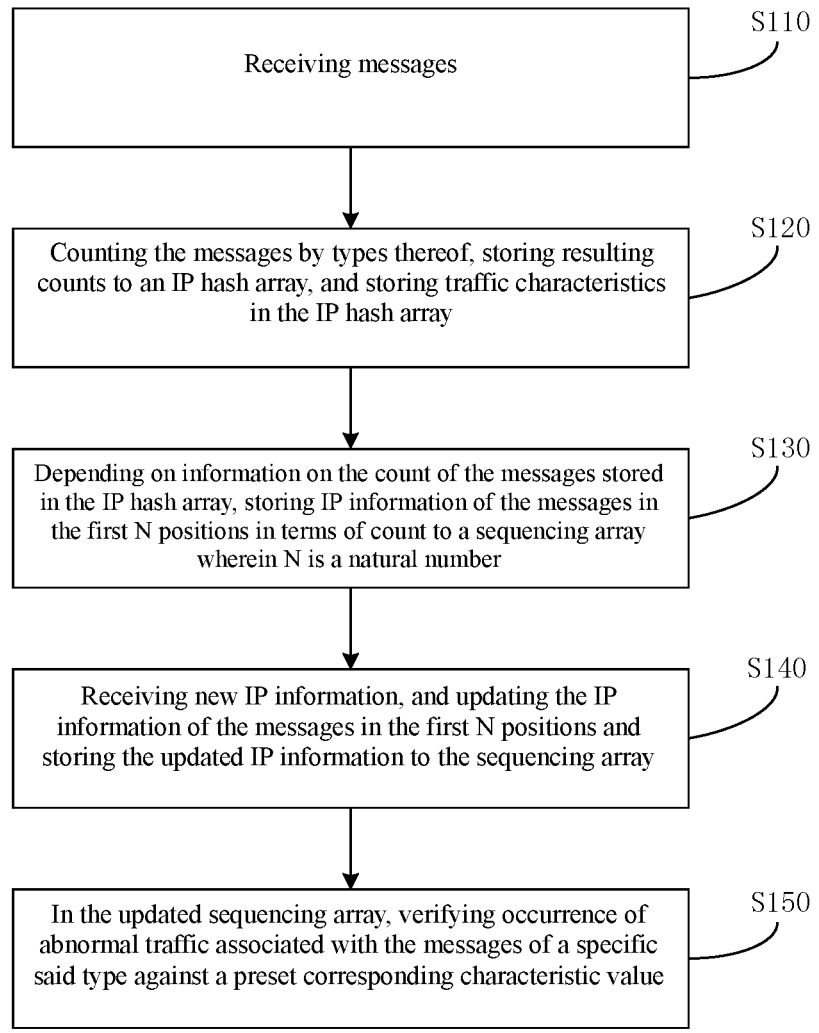
FIG. 1 is a flowchart of a method for detecting abnormal traffic according to a first embodiment of the present disclosure.

FIG. 1 is a flowchart of a method for detecting abnormal traffic according to a first embodiment of the present disclosure. According to the present embodiment, the disclosed method for detecting abnormal traffic may be performed using any available traffic-detecting device. Such a device may be in the form of software and/or hardware. As shown in FIG. 1, the method includes the following steps.

In S110, messages are received.

In S120, the messages are counted by types thereof, and the resulting counts and traffic characteristics are stored into an IP hash array.

Exemplificative, a universal IP hash array may be created for compiling information such as IP traffic. The IP hash array may include various variables for compiling statistics of the information on IP traffic and so on. Preferably, the IP hash array may be used to compile statistics of message information contained in the IP traffic. For example, the IP hash array may include variables SYN, ICMP and UDP for compiling statistics of counts of synchronous messages (syn messages), control information message (icmp messages) and user data messages (udp messages), respectively. Since synchronous messages and control information messages have relatively unitary traffic characteristics and thus are relatively easy to determine whether attacks exist, it is possible to make determination directly basing on how often these two kinds of messages occur. However, user data messages have multi-variate traffic characteristics, so no matter how often this kind of messages occurs it may be normal. Therefore, determination of abnormality related to user data messages has to depend on how often their ports appear and how identical check codes are. The IP hash array may also include variable DNA, for extracting traffic characteristics of user data messages, in which multiple members may be included. Preferably, DNA members may include CUR, SAME, REPLY and TCP.

Figure 2:
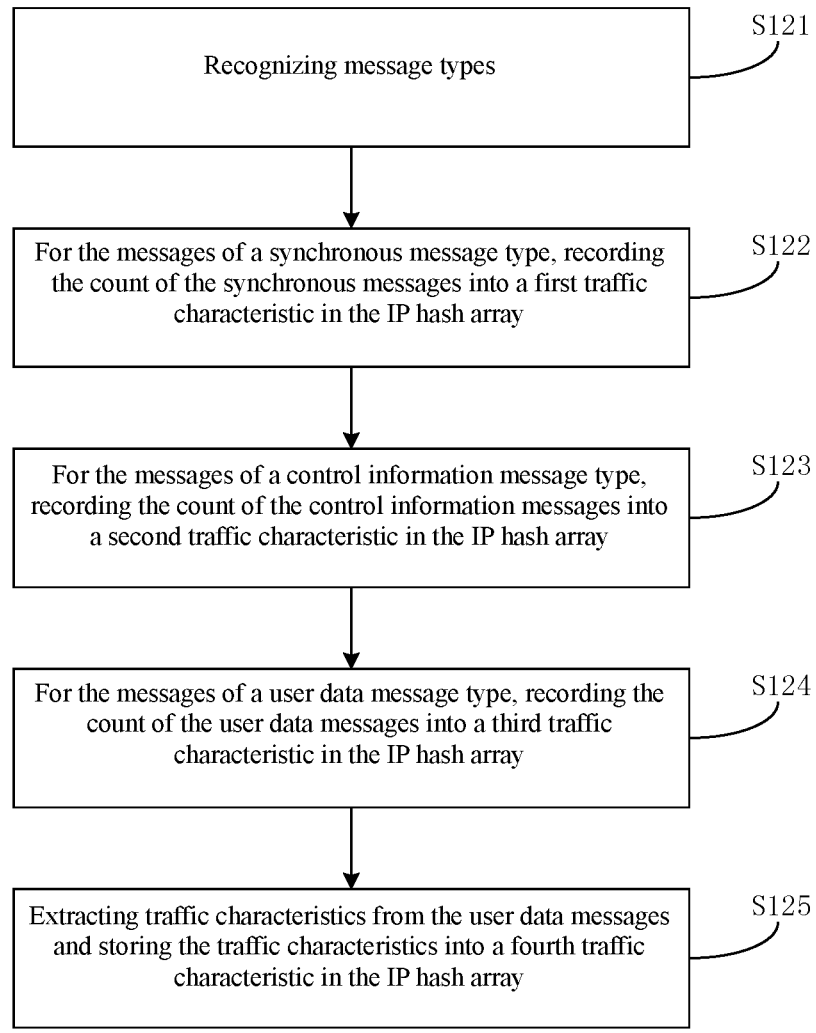
FIG. 2 is a flowchart further illustrating the method for detecting abnormal traffic of FIG. 1 in detail.

Referring to FIG. 2, based on the foregoing scheme, the operation involves:

In S121, recognizing message types;

In S122, for synchronous messages, recording the count thereof into a first traffic characteristic in the IP hash array;

In S123, for control information messages, recording the count thereof into a second traffic characteristic in the IP hash array;

In S124, for user data messages, recording the count thereof into a third traffic characteristic in the IP hash array; and In S125, extracting traffic characteristics from the user data messages and storing the traffic characteristics into a fourth traffic characteristic in the IP hash array.

In S130, depending on information on the counts of the messages stored in the IP hash array, IP information of the messages in the first N ranks is stored to a sequencing array, wherein N is a natural number.

Exemplificatively, a universal sequencing array (TOP array) is created for storing the IP information of the first N ranks and the sequencing array is initialized. The sequencing array is composed of a first sequencing sub-array (SYN), a second sequencing sub-array (ICMP) and a third sequencing sub-array (UDP). Each of the sub-arrays has a length of N+1 (not applied to a member having its first subscript as 0), for storing the IP information of the messages in the first N ranks. Furthermore, depending on information on the counts of the messages stored in the IP hash array, according to the message type, the IP information of the messages in the first N ranks in terms of count is stored into the respective sequencing sub-array in the form of minimum binary heap. For example, the IP information of the synchronous messages in the first N ranks is stored into the first sequencing sub-array. The IP information of the control information messages in the first N ranks is stored into the second sequencing sub-array. The IP information of the user data messages in the first N ranks is stored into the third sequencing sub-array.

In S140, new IP information is received and the IP information of the messages in the first N ranks is updated and stored into the sequencing array.

The sequencing array is a dynamic array, which needs to be re-sequenced depending on the exact new IP information and according to the propertied of minimum binary heaps.

In S150, in the updated sequencing array, occurrence of abnormal traffic associated with the messages of a specific said type against a preset corresponding characteristic value is verified.

Furthermore, the preset characteristic value is customized depending on the total traffic of the network where the method is used, and may be 10000, for example. The characteristic value may be set high, such as 100000, when applied to a network with relatively large traffic, and may be set low, such as 1000, when applied to a network with small traffic. Setting of the characteristic value is flexible and may be made according to the practical needs, without particular limitation.

The method for detecting abnormal traffic according to the first embodiment of present disclosure creates a universal IP hash array and a universal sequencing array for storing and sequencing various indexes of IP information and performs traffic check and analysis, so as to identify those targets having indexes, such as traffic, leading other targets in the entire network in a real-time manner, significantly reducing false positive and negative rates and analyze behavior of these identified targets into detail to accurately and timely detect traffic abnormality and significantly reduce false positive and negative rates.

Embodiment II

Figure 3:
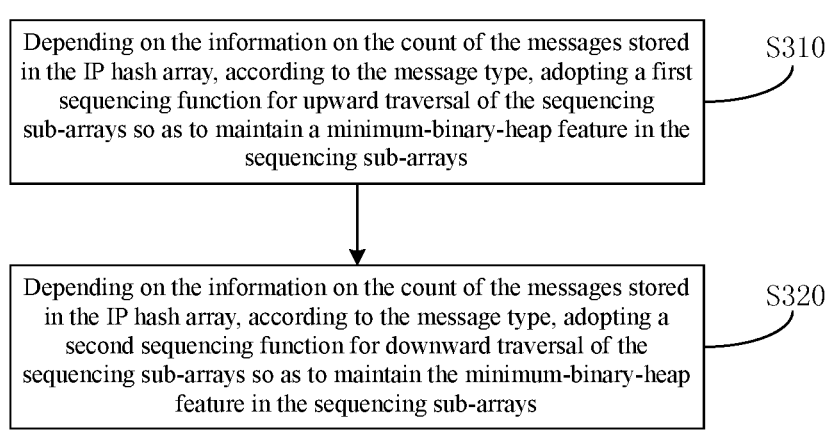
FIG. 3 is a flowchart of a method for detecting abnormal traffic according to a second embodiment of the present disclosure.

FIG. 3 is a flowchart of a method for detecting abnormal traffic according to a second embodiment of the present disclosure. The technical scheme of the present embodiment is based on the first embodiment and provides further optimization thereon.

Further, the step of depending on the information on the count of the messages stored in the IP hash array, storing the IP information of the messages in the first N ranks in terms of count to the respective sequencing sub-arrays by the message types and in the form of minimum binary heaps includes:

In S310, depending on information on the counts of the messages stored in the IP hash array, according to message type, adopting a first sequencing function for upward traversal of the sequencing sub-arrays so as to maintain a minimum-binary-heap feature in the sequencing sub-arrays; and In S320, depending on information on the counts of the messages stored in the IP hash array, according to message type, adopting a second sequencing function, by downward traversing the sequencing sub-arrays so as to maintain the minimum-binary-heap feature in the sequencing sub-arrays.

Exemplificatively, each member in the sequencing array is a minimum binary heap. In other words, each of the members in the sequencing array is present as a complete binary tree. The following example is made to the first sequencing sub-array.

Assuming that TOP→SYN[i] is a non-leaf node, its left child is TOP→SYN[i*2], and its right child is TOP→SYN[i*2+1]. At this time the first non-leaf node of the minimum binary heap starts from 1.

Assuming that TOP→SYN[i] is a non-leaf node, its left child is TOP→SYN[i*2+1], and its right child is TOP-→SYN[i*2+2]. At this time the first non-leaf node of the minimum binary heap starts from 0.

Assuming that TOP→SYN[i] is a non-leaf node, its left child is TOP→SYN[i*2−1], and its right child is TOP-→SYN[i*2]. At this time the first non-leaf node of the minimum binary heap starts from 2.

Many instances may be seen here provided that the values from i−N+i and on are the node subscript values of the minimum binary heaps and that the node subscript value of the left child is greater than its parent node's subscript value, and the node subscript value of the right child is greater than the left child's node subscript value.

Setting the first sequencing function and the second sequencing function is to maintain the minimum-binary-heap feature of the sequencing array. Preferably, the first sequencing function is set as top_up(j), and the second sequencing function is set as top_down(j). Assuming that the current sequencing array possesses the features of minimum binary heaps, when the value at the location j is updated and the new value is smaller than the original value, this node's new value may be smaller than its parent node's value. Thus, it is necessary to shift upward until the sequencing array regains the minimum-binary-heap feature. These operations are done by top_up(j). The first sequencing function works by upward traversing the sequencing sub-arrays so as to maintain the minimum-binary-heap feature in the sequencing sub-arrays. Similarly in terms of principle, top_down(j) works in an opposite way to top_up(j). The second sequencing function works by downward traversing the sequencing sub-arrays so as to maintain the minimum-binary-heap feature in the sequencing sub-arrays.

The method according to the second embodiment of the present disclosure uses minimum binary heaps to sequence the sequencing array and maintain the features of minimum binary heaps in the sequencing array. Therefore, in the child node, there are only two possible cases, namely the left child and the right child, so the sequencing relation of the entire sequencing array is simple and clear. Meanwhile, when there is new IP information coming, the first sequencing function or the second sequencing function is applied for upward or downward traversal to re-sequence the sequencing array, having the benefit of logical clarity.

Embodiment III

Figure 4:
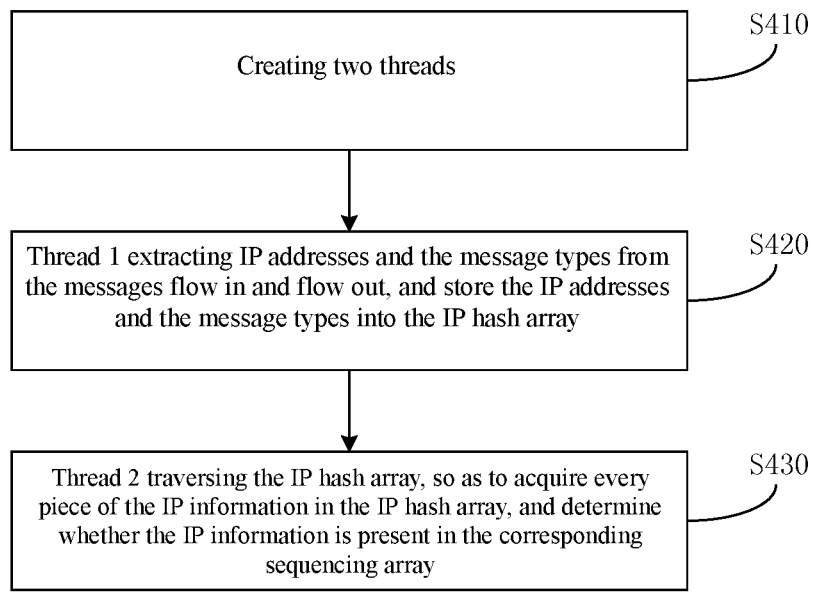
FIG. 4 is a flowchart of a method for detecting abnormal traffic according to a third embodiment of the present disclosure.

FIG. 4 is a flowchart of a method for detecting abnormal traffic according to a third embodiment of the present disclosure. The technical scheme of the present embodiment is based on the preceding embodiments and provides further optimization thereon.

Further, the step of receiving the new IP information, updating the IP information of the messages in the first N ranks and storing the updated IP information to the sequencing array includes the following steps.

In S410, two threads are created.

In S420, the first thread extract IP addresses and message types from inflowing and outflowing messages and stores them into the IP hash array.

Exemplificatively, where the message is a synchronous message, HASH[IP]→SYN+1, which means adding one to the count of the synchronous messages in the IP hash array.

Alternatively, where the message is a control information message, HASH[IP]→ICMP+1, which means adding one to the count of the control information messages in the IP hash array.

Alternatively, where the message is a user data messages, HASH[IP]→UDP+1, which means adding one to the count of the user data messages in the IP hash array.

Furthermore, if IP exists in the third sequencing sub-array, the source port (SPORT), the target port (DPORT) and the check value (CHECK) are extracted from the message.

Exemplificatively, where the value of the source port is one of some specific values, such as 123, 1900 and 53 which are port numbers in the network having seen attacks for example, HASH[IP]→DNA→REPLY+1, which means adding one to the count of the member REPLY in DNA in the IP hash array.

Where the value of the target port is one of some specific values, such as 22, 80, and 443 which are port numbers in the network having seen attacks for example, HASH[IP] →DNA→TCP+1, which means adding one to the count of the member TCP in DNA in the IP hash array.

Where CHECK=HASH[IP]→DNA→CUR, HASH[IP] →DNA→SAME+1; otherwise, HASH[IP] →DNA→CUR=CHECK. In other words, when the check value is the same as the value taken by the member CUR in DNA in the IP hash array, the count of the member SAME in DNA in the IP hash array is added by 1; otherwise, the value of the member CUR in DNA in the IP hash array is assigned to the check value.

Whenever there are messages flowing in or out, the first thread works to extract IP addresses and message types from these inflowing and outflowing messages and store the extracted data into the IP hash array.

In S430, the second thread traverses the IP hash array and acquires every piece of IP information in the IP hash array, so as to determine whether the IP information exists in the corresponding sequencing array.

If absence is confirmed, traffic characteristics corresponding to the IP information is compared to the traffic characteristics corresponding to the first piece of the IP information in the sequencing array. If the former is greater than the traffic characteristics corresponding to the first piece of the IP information, the first piece of the IP information is replaced and the second sequencing function is applied.

If presence is confirmed, the new traffic characteristic of the IP information is compared to the old traffic characteristic of the same piece of IP information in the sequencing array. Depending on the comparison, the first sequencing function or the second sequencing function is applied so as to maintain the minimum-binary-heap feature in the sequencing array, and then the new traffic characteristic is compared to the old traffic characteristic, thereby determining whether abnormal traffic occurs.

Figure 5:
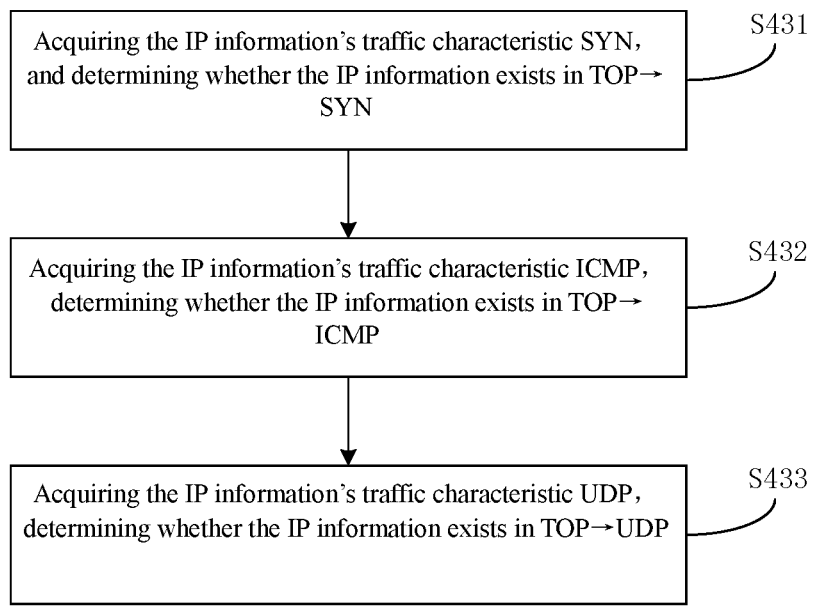
FIG. 5 is a flowchart further illustrating the method for detecting abnormal traffic of FIG. 4 in detail.

Referring to FIG. 5, preferably, based on the foregoing scheme, the operation involves the following steps.

In S431, the IP information's traffic characteristic SYN is acquired and it is determined whether the IP information exists in TOP→SYN.

If absence is confirmed, the IP information's traffic characteristic SYN is compared to the traffic characteristic SYN of the first piece of the IP information in the TOP→SYN array. Where the former is greater than the first piece of the IP information's traffic characteristic SYN, the first piece of the IP information is replaced and the IP information is marked as having TOP_SYN property (i.e. existing in the TOP→SYN array). Then the TOP_SYN property of the replaced IP information is canceled, and top_down(j) is applied to make the new sequencing array regain the features of the minimum binary heap.

If presence is confirmed, the IP information's new traffic characteristic SYN is compared to the old traffic characteristic SYN of this very piece of IP information in the TOP→SYN array. Where the new traffic characteristic SYN is smaller than the old traffic characteristic SYN, TOP→SYN[j] is updated with the new traffic characteristic SYN and top_up(j) is applied; otherwise, TOP→SYN[j] is updated with the new traffic characteristic SYN and top_down(j) is applied.

The new traffic characteristic SYN and the old traffic characteristic SYN are compared. Where the difference between the former and latter SYNs is greater than a certain preset characteristic value, which may be 10000, for example, it is determined that an SYN FLOOD attack is taking place and causing abnormal traffic.

In S432, the IP information's traffic characteristic ICMP is acquired and it is determined whether the IP information exists in TOP→ICMP.

If absence is confirmed, the IP information's traffic characteristic ICMP is compared to the first piece of the IP information's traffic characteristic in the ICMPTOP→ICMP array. Where the former is greater than the first piece of the IP information's traffic characteristic ICMP, the first piece of the IP information is replaced and the IP information is marked as having TOP_ICMP property (i.e. existing in the TOP→ICMP array). Then the TOP_ICMP property of the replaced IP information is canceled and top_down(j) is applied to make the new sequencing array regain the features of the minimum binary heap.

If presence is confirmed, the IP information's new traffic characteristic ICMP is compared to the IP information's old traffic characteristic ICMP in the TOP→ICMP array. Where the new traffic characteristic ICMP is smaller than the old traffic characteristic ICMP, TOP→ICMP [j] is updated with the new traffic characteristic ICMP and top_up(j) is applied; otherwise, TOP→ICMP [j] is updated with the new traffic characteristic ICMP and top_down(j) is applied.

The new traffic characteristic ICMP and the old traffic characteristic ICMP are compared. Where the difference between the former and latter ICMPs is greater than a certain preset characteristic value, which may be 10000, for example, it is determined that an ICPM FLOOD attack is taking place and causing abnormal traffic.

In S433, the IP information's traffic characteristic UDP is acquiring and it is determined whether the IP information exists in TOP→UDP.

If absence is confirmed, the IP information's traffic characteristic UDP is compared to the traffic characteristic UDP corresponding to the first piece of the IP information in the TOP→UDP array, if the former is greater than the latter, the first piece of the IP information is replaced and marked as having TOP_UDP property (i.e. existing in the TOP→UDP array) and the TOP_UDP property of the replaced IP information is canceled. Then top_down(j) is applied to make the new sequencing array regain the features of minimum binary heaps.

If presence is confirmed, the IP information's new traffic characteristic UDP is compared to the old traffic characteristic UDP of this piece of IP information in the TOP→UDP array. Where the new traffic characteristic UDP is smaller than the old traffic characteristic UDP, TOP→UDP [j] is updated with the new traffic characteristic UDP and top_up (j) is applied; otherwise, TOP→UDP [j] is updating the new traffic characteristic UDP and top_down(j) is applied.

The new traffic characteristic UDP is compared to the old traffic characteristic UDP. Since attacks in the form of user data messages are various, detailed analysis is required.

If the difference between the former and latter REPLYs in HASH[IP]→DNA→REPLY is greater than a certain preset characteristic value, which may be 10000, for example, it is determined that a UDP FLOOD attack is taking place and causing abnormal traffic.

If the difference between the former and latter TCPs in HASH[IP]→DNA→TCP is greater than a certain preset characteristic value, which may be 10000, for example, it is determined that a UDP FLOOD attack is taking place and causing abnormal traffic.

If the difference between the former and latter SAMEs in HASH[IP]→DNA→SAME is greater than a certain preset characteristic value, which may be 10000, for example, it is determined that a UDP FLOOD attack is taking place and causing abnormal traffic.

In other words, comparison is made between differences between the former and latter values of the members REPLY, TCP and SAME in DNA in the IP hash array and the preset characteristic values, so as to determine whether traffic abnormality occurs.

Exemplificatively, the second thread may be set as being triggered regularly. For example, it may be set as being triggered once every second.

The method according to the third embodiment of the present disclosure combines real-time ranking and behavioral analysis to detect attacks and determine whether abnormal traffic occurs. Since the attacked target must have one or more indexes ranking high, the most risked targets can be effectively identified. This is followed by behavioral analysis to accurately determine whether these targets are attacked. The disclosed method is suitable for all networks and capable of detecting attacks made at the initial stage a program is trigger and recognizing normal traffic surges correctly, thereby preventing false reports.

Embodiment IV

Figure 6:
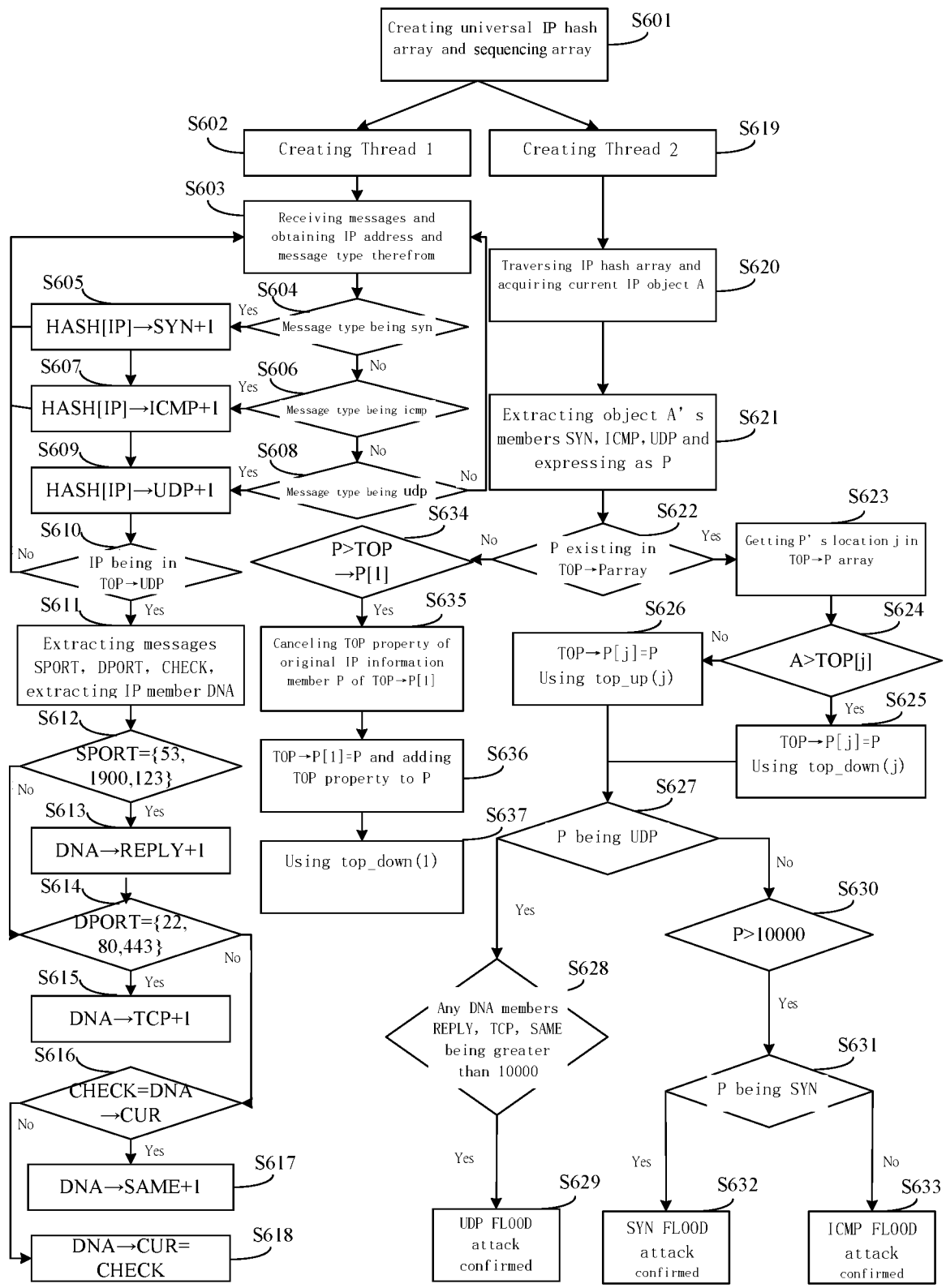
FIG. 6 is a flowchart of a method for detecting abnormal traffic according to a fourth embodiment of the present disclosure.

FIG. 6 is a flowchart of a method for detecting abnormal traffic according to a fourth embodiment of the present disclosure. The technical scheme of the present embodiment is based on and further developed from the foregoing embodiments.

The method includes the following steps:

In S601, a universal IP hash array and a sequencing array are created.

The IP hash array serves to compile statistics of information such as IP traffic. The IP hash array may include variables SYN, ICMP, UDP and DNA, for compiling statistics of the count of synchronous messages, the count of control information messages, the count of user data messages respectively and for extracting traffic characteristics of user data messages. The sequencing array serves to store IP information of the messages ranking in the first N ranks.

In S602, Thread 1 is created.

In S603, Thread 1 receives messages and acquires IP addresses and message types therefrom.

In S604, it is determined whether the message is a synchronous message. If the answer is positive, S605 is performed; otherwise, S606 is performed.

In S605, HASH[IP]→SYN+1.

In S606, it is determined whether the message is a control information message. If the answer is positive, S607 is performed; otherwise, S608 is performed.

In S607, HASH[IP] →ICMP+1.

In S608, it is determined whether the message is a user data message. If the answer is positive, S609 is performed; otherwise, the method returns to perform S603.

In S609, HASH[IP]→UDP+1.

In S610, it is determined whether IP exists in the TOP→UDP array If the answer is positive, S611 is performed; otherwise, S603 is performed.

In S611, the messages SPORT, DPORT, CHECK are extracted and the IP member DNA is extracted.

Exemplificatively, since user data messages have various traffic characteristics, it is necessary to check how often the ports appear and how identical the check codes are before determination. Preferably, SPORT, DPORT and CHECK are selected for detailed analysis of user data messages. DNA serves to extract traffic characteristics of user data messages, and may include multiple members. Preferably, the DNA members include CUR, SAME, REPLY and TCP.

In S612, it is determined whether the value of the SPORT is one of some specific values, such as 123, 1900 and 53 which are port numbers in the network having seen attacks for example, HASH[IP]→DNA→REPLY+1, which means adding one to the count of the member REPLY in DNA in the IP hash array. If the answer is positive, S613 is performed; otherwise, S614 is performed.

In S613, DNA→REPLY+1.

In S614, it is determined whether DPORT is of some specific values, which may be some ports in the network that have seen attacks, such as 22, 80, and 443. If the answer is positive, S615 is performed; otherwise, S616 is performed.

In S615, DNA→TCP+1.

In S616, it is determined whether CHECK is equal to DNA→CUR. If the answer is positive, S617 is performed; otherwise, S618 is performed.

In S617, DNA→SAME+1.

In S618, DNA→CUR=CHECK.

In S619, Thread 2 is created.

In S620, Thread 2 traverses the IP hash array so as to acquire the current IP object A.

In S621, the object A's members SYN, ICMP, UDP are extracted successively and expressed as P.

In S622, it is determined whether P exists in the TOP→P array. If the answer is positive, S623 is performed; otherwise, S634 is performed.

In S623, P's location j in the TOP→P array is obtained.

In S624, it is determined whether A is greater than TOP[j]. If the answer is positive, S625 is performed; otherwise, S626 is performed.

In S625, for TOP→P[j]=P, top_down(j) is applied.

In S626, for TOP→P[j]=P, top_up(j) is applied.

In S627, it is determined whether P is UDP. If the answer is positive, S628 is performed; otherwise, S630 is performed.

In S628, it is determined whether any of the DNA members REPLY, TCP, SAME is greater than the preset characteristic value, which may be 10000, for example. If the answer is positive, S629 is performed.

In S629, it is confirmed that a UDP FLOOD attack is taking place.

In S630, it is determined whether P is greater is performed characteristic value, which may be 10000, for example. If the answer is positive, S631 is performed.

In S631, it is determined whether P is of the SYN type. If the answer is positive, S632 is performed; otherwise, S633 is performed.

In S632, it is confirmed that a SYN FLOOD attack is taking place.

In S633, it is confirmed that an ICMP FLOOD attack is taking place.

In S634, it is determined whether P is greater than TOP→P[1]. If the answer is positive, S635, S636 and S637 are performed successively.

In S635, the TOP property of the original IP information member P of TOP→P[1] is canceled.

In S636, TOP→P[1]=P and P is added with TOP property.

In S637, top_down(1) is applied.

The method of Embodiment IV of the present disclosure combines the technical schemes of the preceding embodiments to identify those targets having indexes, such as traffic, leading other targets in the entire network comprehensively and thoroughly, and analyzing behavior of these identified targets to accurately determine whether they have abnormal traffic, thereby accurately and timely detecting traffic abnormality and significantly reducing false positive and negative rates.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A method for detecting abnormal traffic, comprising:
   receiving messages;
   counting the messages by types thereof, storing resulting counts to an IP hash array, and storing traffic characteristics in the IP hash array;
   depending on the counts of the messages stored in the IP hash array, storing IP information of the messages in the first N ranks in terms of ordering of the counts to a sequencing array wherein N is a natural number;
   receiving new IP information, and updating the IP information of the messages in the first N ranks and storing the updated IP information to the sequencing array;
   in the updated sequencing array, verifying occurrence of abnormal traffic associated with the messages of a specific said type against a preset corresponding characteristic value;
   wherein the counting the messages by the types, storing the resulting counts to the IP hash array, and storing traffic characteristics in the IP hash array includes:
   recognizing the messages by different message types, wherein the different message types include a synchronous message type, a control information message type, or a user data message type;
   for the messages of the synchronous message type, recording the count of the synchronous messages into a first traffic characteristic in the IP hash array;
   for the messages of the control information message type, recording the count of the control information messages into a second traffic characteristic in the IP hash array;
   for the messages of the user data message type, recording the count of the user data messages into a third traffic characteristic in the IP hash array; and
   extracting at least one of a source port, target port, or check value from the user data messages and storing the at least one of a source port, target port, or check value into a fourth traffic characteristic in the IP hash array; and
   initializing the sequencing array, wherein the sequencing array includes a first sequencing sub-array, a second sequencing sub-array, and a third sequencing sub-array, and each said sub-array has a length of N+1 for holding the IP information of the messages in the first N ranks.

2. The method of claim 1, further comprising:

depending on the count of the messages stored in the IP hash array, storing the IP information of the messages in the first N ranks in terms of count to the sequencing array including: depending on the count of the messages stored in the IP hash array, storing the IP information of the messages in the first N ranks in terms of count to the respective sequencing sub-arrays by the message types and in the form of minimum binary heaps.

3. The method of claim 2, wherein depending on the count of the messages stored in the IP hash array, storing the IP information of the messages in the first N ranks in terms of count to the respective sequencing sub-arrays by the message types and in the form of minimum binary heaps includes:

depending on the count of the messages stored in the IP hash array, according to the message type, adopting a first sequencing function for upward traversal of the sequencing sub-arrays so as to maintain a minimum-binary-heap feature the sequencing sub-arrays, wherein the minimum-binary-heap feature includes each node of the sequencing sub-arrays having a value greater than its respective parent node; or depending on the count of the messages stored in the IP hash array, according to the message type, adopting a second sequencing function for downward traversal of the sequencing sub-arrays so as to maintain the minimum-binary-heap feature in the sequencing sub-arrays wherein the minimum-binary-heap feature includes each node of the sequencing sub-arrays having a value greater than its respective parent node.

4. The method of claim 1, wherein the receiving the new IP information, updating the IP information of the messages in the first N ranks and storing the updated IP information to the sequencing array includes:

creating two threads, which are a first thread serving to extract IP addresses and the message types from the messages flow in and flow out, and store the IP addresses and the message types into the IP hash array; and a second thread serving to traverse the IP hash array, so as to acquire every piece of the IP information in the IP hash array, and determine whether the IP information is present in the corresponding sequencing array; and if absence is confirmed, comparing the traffic characteristic corresponding to the IP information with the traffic characteristic of the first piece of the IP information in the sequencing array, and if the former is greater than the latter, replacing the first piece of the IP information and applying the second sequencing function; or if presence is confirmed, comparing the new traffic characteristic of the IP information with the old traffic characteristic of that IP information in the sequencing array, and applying the first sequencing function or the second sequencing function depending on the comparison, so as to maintain a minimum-binary-heap feature in the sequencing array, and then comparing the new traffic characteristic with the old traffic characteristic so as to determining whether abnormal traffic occurs, wherein the traffic characteristic corresponding to each respective IP information compared includes one or more of: the count of the synchronous messages; the count of the control information messages; the count of the user data messages; or at least one of a source port, target port, or check value from the user data messages.

5. The method of claim 1, wherein in the updated sequencing array, verifying occurrence of abnormal traffic associated with the messages of a specific said type against a preset corresponding characteristic value:

the preset characteristic value is set depending on total traffic of a network in which the method is used.

6. The method of claim 1, wherein the extracting of the at least one of the source port, target port, or check value is performed on the user data messages which are recorded in the third traffic characteristic in the IP hash array.

* * * * *